UNITED STATES PATENT OFFICE.

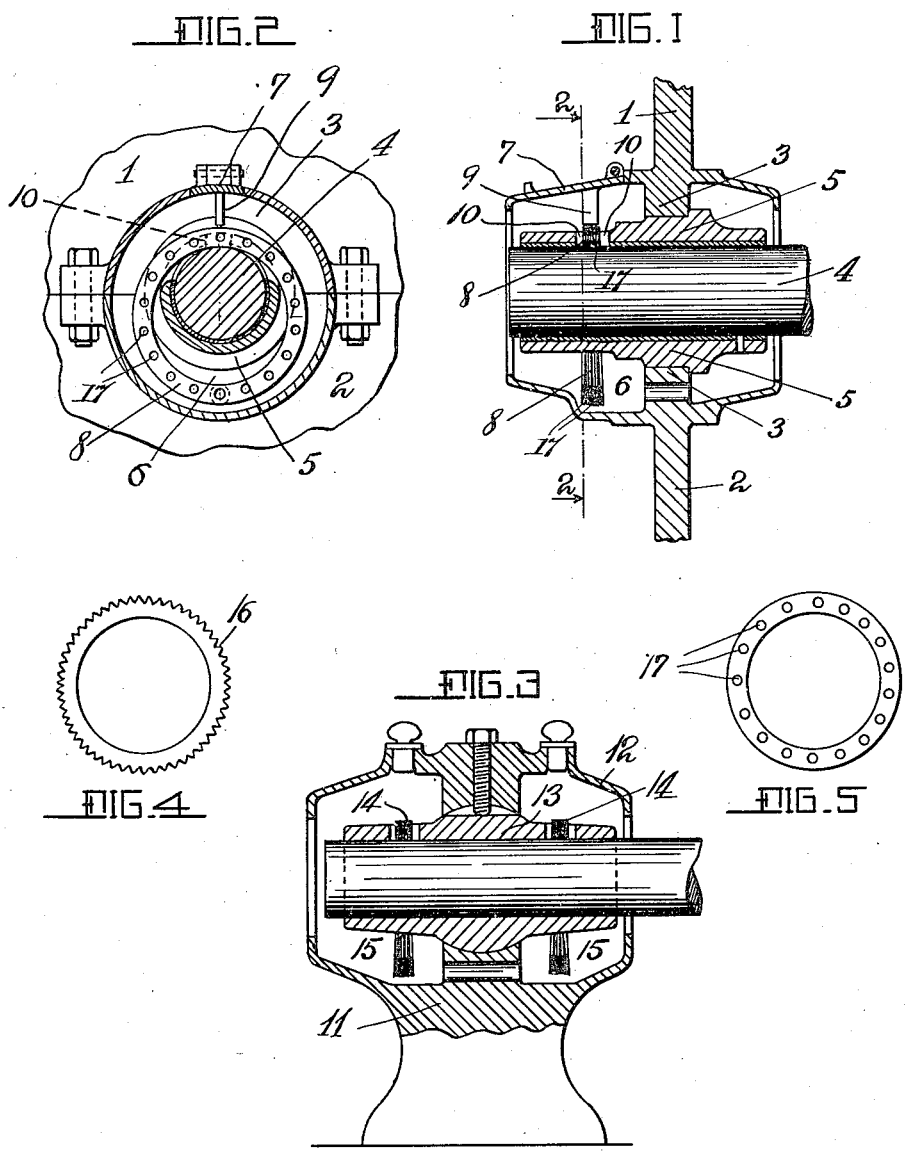

JAMES BURKE, OF ERIE, PENNSYLVANIA, ASSIGNOR TO BURKE ELECTRIC COMPANY, A CORPORATION OF PENNSYLVANIA.

SELF-OILING BEARING.

1,017,132.  Specification of Letters Patent.  Patented Feb. 13, 1912.

Application filed September 17, 1907. Serial No. 393,336.

*To all whom it may concern:*

Be it known that I, JAMES BURKE, a citizen of the United States, residing at Erie, in the county of Erie and State of Pennsylvania, have invented certain new and useful Improvements in Self-Oiling Bearings, of which the following is a full, clear, and exact specification.

My invention relates to self oiling bearings, and although well adapted for use in dynamo electric machines, is also of advantage for use in bearings generally.

Prior to my invention, it has been common practice to use self oiling bearings in which a brass ring seats in a slot in the bearing sleeve and engages the upper portion of the shaft which is exposed in this slot. The rotation of the shaft serves to rotate the ring which latter dips in a reservoir of oil below the shaft and so causes the oil to be carried from this reservoir to the upper portion of the shaft, whence the oil works in between the bearing surfaces. This construction is objectionable on account of the small amount of oil supplied to the bearing, and on account of the comparatively large cost of manufacture. It is also objectionable because the movement of the ring is frequently irregular giving irregularity in the oil supply. This is due mainly to a film of oil sometimes entirely separating the ring from good contact with the shaft which so reduces the friction that the ring will slip excessively or stop.

The object of my present invention is to provide a self oiling bearing which will overcome these objections, and which shall be simple in construction and of a high degree of efficiency and reliability. Instead of using the oil ring of brass or other metal of customary construction, I have found by experiment that far better results are secured by the use of a series of apertured disks placed side by side when held sufficiently close together so that each will coöperate with the adjacent disk in carrying the oil to the upper portion of the bearing surfaces, the aperture of each disk being of greater diameter than the shaft. The apertured disks are preferably formed from thin sheet metal such as the sheet iron from which the laminæ of dynamos and motors are constructed, but it will sometimes be desirable to form the disks from non-magnetic sheet metal, or provide outside disks of non-magnetic metal to avoid magnetic effect. The series of disks of course afford a large surface area which serves to carry the oil from the reservoir to the upper portion of the shaft bearings, and this large area becomes still more effective by the coöperation of the adjacent disks in bringing the oil to the outside surfaces. When the disks dip into the oil in the reservoir they each become thoroughly covered with oil over their entire surface, and the rotation consequently results in bringing a comparatively large quantity of oil to the bearing. The action is particularly effective by reason of the fact that when the rings pass through the oil reservoir, they tend to separate and allow the oil to gather between them, and when the rotation brings this portion of the disks above the bearing, they are pressed together somewhat which forces the oil out from between the disks. A copious supply of oil is thus furnished to the bearing. Also the higher the speed of the shaft, the greater is the amount of oil supplied. Also the friction between the disks and the shaft is entirely sufficient to give uniform rotation and therefore uniform flow of oil. This desirable action occurs by reason of the individual freedom of movement of the disks and of the narrow edges thereof which easily cut through the oil film to the shaft; one or more of the disks are consequently always in good contact with the shaft.

My invention will be understood from the following description and accompanying drawings, in which—

Figure 1 is a sectional view of one form of bearing embodying my invention; Fig. 2 is a section on line 2—2 of Fig. 1; Fig. 3 is a sectional view showing my invention applied to another form of construction; and Figs. 4 and 5 are side views of modified forms of disks.

Referring to Figs. 1 and 2, the character 1 indicates an upper frame portion and 2 a lower frame portion, the parts sometimes being separable on a central horizontal plane. The supporting frame carries the bearing supports 3, between which and the shaft 4 is interposed the bearing sleeve 5 of suitable material. The frame also has formed therein an oil reservoir 6 and is provided with a hinged cover 7. A slot is cut in the upper portion of the bearing sleeve in which are located the disks 8 above referred to and which engage the shaft at their inner edge or inner engaging surface. These disks are of larger diameter than the shaft in order that their lower portion will pass through the oil in the lower part of the reservoir 6. The disks used may have any suitable size, form and proportions and may be of any desirable form of cross section. The cover 7 is shown provided with a projection 9 which, when the cover is closed, is located immediately above the disks and serves to remove the oil from their outer surfaces and assist in forcing the oil into the bearing. One or more notches 10 are preferably formed in the bearing sleeve at the sides of the slot to serve as pockets and paths for the oil into the bearing. Any desired number of apertured disks may be used but of course if an insufficient number is used so that the disks are considerably separated, they will not coöperate to bring sufficient oil to the bearing, and on the other hand if too large a number are used for a given size of groove, the oil cannot freely pass in between the disks, and therefore will not give the best results. Also if too large a number of disks are used they will not rotate smoothly or uniformly. Within limits the amount of oil fed to the bearings may be regulated by the number of disks used. Also the speed of the disks may be regulated by the number of disks used; and by using a proper number, excessive speeds or irregularity in movement are overcome.

In Fig. 3 a bearing of common type of construction is shown with my invention applied thereto. The main pedestal or supporting frame is shown at 11 having the cap 12 and containing the self alining bearing sleeve 13. Within the slots formed in the upper part of the bearing sleeve and engaging the upper portion of the shaft are the disks 14. The disks extend below into the oil reservoir 15 and the rotation of the shaft causes the disks to furnish a copious supply of oil to the bearings in the manner already explained.

In Fig. 4 I have shown a form of disk 16 in which the peripheral surface is increased by the formation of projections or by cutting away portions of the disk to form recesses at the outer edge thereof.

In Fig. 5 the disk is perforated having the series of holes or recesses 17 cut or otherwise formed therein. This form may sometimes be desirable.

Each disk may be perforated and also provided with projections. In assembling groups of disks I may use one or more of the several types of disks according to the purposes desired.

While I have shown and described certain forms of my invention particularly, it will be understood that my invention may be embodied in various other forms of construction.

Having thus described my invention, I declare that what I claim as new and desire to secure by Letters Patent, is,—

1. In a self-oiling bearing, the combination of a shaft and bearing therefor, a reservoir for lubricant, and a plurality of lubricating disks coöperating with each other and lying immediately adjacent each other along a line parallel to the axis of said shaft, said disks being rotated by said shaft and adapted at their lower portions to pass through the lubricant in said reservoir.

2. In a self-oiling bearing, the combination of a shaft and bearing therefor, a reservoir for lubricant, and a plurality of lubricating disks coöperating with each other and lying immediately adjacent each other along a line parallel to the axis of said shaft, said disks having oil carrying recesses, said disks being supported at their upper portions by said shaft and rotated thereby, and adapted at their lower portions to pass through the lubricant in said reservoir.

3. In a self-oiling bearing, the combination of a shaft, a bearing and supporting frame for the same, a reservoir for lubricant, a plurality of lubricating disks laterally adjacent each other carried and rotated by said shaft, each of said disks having laterally opening recesses and adapted at its lower portion to pass through the lubricant in said reservoir, and means for positively removing the lubricant from said disks to said bearing, said means comprising a part carried by said frame.

4. In a self-oiling bearing, the combination of a shaft, a bearing and supporting frame for the same, a reservoir for lubricant, a plurality of coöperating disks lying immediately adjacent each other along a line parallel to the axis of said shaft, said disks being carried at their upper portions by said shaft and thereby rotated, and adapted at their lower portions to pass through the lubricant in said reservoir, and means for positively removing oil from said disks to said bearing, said means comprising a part carried by said frame.

5. In a self-oiling bearing, the combination of a shaft and bearing therefor, a reservoir for lubricant, and a plurality of movable lubricating elements coöperating with each other and lying immediately contiguous to each other along a line parallel to the axis of said shaft, said elements being rotated by said shaft and adapted at their lower portions to pass through the lubricant in said reservoir.

In testimony whereof I affix my signature, in presence of two witnesses.

JAMES BURKE.

Witnesses:
L. K. SAGER,
GEO. A. HOFFMAN.